United States Patent
Schäfer et al.

(10) Patent No.: US 12,522,848 B2
(45) Date of Patent: Jan. 13, 2026

(54) HOST CELLS AND THEIR USE FOR PRODUCING RIBITOL AND FURTHER MONOSACCHARIDES

(71) Applicant: DANSTAR FERMENT AG, Zug (CH)

(72) Inventors: Astrid Schäfer, Reinach (CH); Yiming Chang, Reinach (CH); Sumire Honda Malca, Reinach (CH)

(73) Assignee: DANSTAR FERMENT AG, Zug (CH)

( * ) Notice: Subject to any disclaimer, the term of this patent is extended or adjusted under 35 U.S.C. 154(b) by 602 days.

(21) Appl. No.: 17/779,561

(22) PCT Filed: Dec. 17, 2020

(86) PCT No.: PCT/EP2020/086789
§ 371 (c)(1),
(2) Date: May 25, 2022

(87) PCT Pub. No.: WO2021/123004
PCT Pub. Date: Jun. 24, 2021

(65) Prior Publication Data
US 2023/0068713 A1    Mar. 2, 2023

(30) Foreign Application Priority Data

Dec. 18, 2019 (DK) .......................... PA 2019 01504

(51) Int. Cl.
| | |
|---|---|
| *C12P 7/18* | (2006.01) |
| *C12N 1/16* | (2006.01) |
| *C12N 9/04* | (2006.01) |
| *C12N 15/80* | (2006.01) |

(52) U.S. Cl.
CPC .................. *C12P 7/18* (2013.01); *C12N 1/16* (2013.01); *C12N 9/0006* (2013.01); *C12N 15/80* (2013.01)

(58) Field of Classification Search
CPC ........... C12P 7/18; C12N 1/16; C12N 9/0006; C12N 15/80; C12N 9/0004
See application file for complete search history.

(56) References Cited

U.S. PATENT DOCUMENTS

| | | | |
|---|---|---|---|
| 2003/0068791 A1* | 4/2003 | Miasnikov | ............... C07H 3/02 435/254.2 |
| 2021/0002620 A1 | 1/2021 | Xu et al. | |

FOREIGN PATENT DOCUMENTS

| | | |
|---|---|---|
| EP | 2957640 A1 | 12/2015 |
| FR | 2762011 A1 | 10/1998 |
| KR | 0142513 A | 12/2015 |

OTHER PUBLICATIONS

Singh et al., Biochemical Engineering Journal 109:189-196, 2016.*
Witkowski et al., Biochemistry 38:11643-11650, 1999.*
Tang et al., Phil Trans R Soc B 368:20120318, 1-10, 2013.*
Seffernick et al., J. Bacteriol. 183(8):2405-2410, 2001.*
Singh et al., Current Protein and Peptide Science 19(1):5-15, 2018.*
Sadowski et al., Current Opinion in Structural Biology 19:357-362, 2009.*
Moon et al., Applied and Environmental Microbiology 78(9):3079-3086, 2012.*
Toivari Mervi H et al. "Metabolic Engineering of Saccharomyces cerevisiae for Conversion of D-Glucose to Xylitol and Other Five-Carbon Sugars and Sugar Alcohols", Applied and Environmental Microbiology, vol. 73, No. 17, Jul. 13, 2007, pp. 5471-5476.
Kayingo Gerald et al. "The MAP kinase Hog1p differentially regulates stress-induced production and accumulation of glycerol and d-arabitol in Candida albicans", Microbiology, vol. 151, No. 9, Sep. 1, 2005, pp. 2987-2999.
Ehrensberg H A et al. "Structure-Guided Engineering of Xylitol Dehydrogenase Cosubstrate Specificity", Structure, vol. 14, pp. 567-575, 2006.
Ghosh D et al. "The refined three-dimensional structure of $3\alpha,20\beta$-hudroxysteriod dehydrogenase and possible roles of the residues conserved in short-chain dehydrogenases", Structure 2, pp. 629-640, 1994.
Moses and Ferrier, "The biochemical preparation of D-xylulose and L-ribulose. Details of the action of Acetobacter suboxydans on D-arabitol, ribitol and other polyhydroxy compounds", Biochem J. Apr. 1962; 83:8-14.
Ahmed et al. "Biochemical preparation of L-ribose and L-arabinose from ribitol: a new approach", J. Biosci Bioeng. 1999; 88(4): 444-448.

* cited by examiner

*Primary Examiner* — Delia M Ramirez
(74) *Attorney, Agent, or Firm* — Hoxie & Associates LLC

(57) ABSTRACT

The present invention relates to host cells and their use wherein the host cells are capable of producing D-ribulose and incapable of or have a reduced capability of converting D-ribulose to a molecule other than ribitol, wherein the host cells comprise a heterologous nucleic acid sequence encoding a polypeptide capable of converting D-ribulose to ribitol with a cofactor preference for NADPH.

16 Claims, No Drawings

Specification includes a Sequence Listing.

HOST CELLS AND THEIR USE FOR PRODUCING RIBITOL AND FURTHER MONOSACCHARIDES

This invention provides host cells, particularly recombinant host cells, capable of producing D-ribulose and incapable of or having a reduced capability for converting D-ribulose to a molecule other than ribitol, wherein the host cells comprise a heterologous nucleic acid sequence encoding a polypeptide capable of converting D-ribulose to ribitol with a cofactor preference for NADPH. The invention further relates to the use of such host cells for producing ribitol, L-ribulose, L-arabinose, or L-ribose. While ribitol and L-ribulose are useful as such, they are further also useful as intermediates in the production of L-arabinose and L-ribose.

A Replacement Sequence Listing as an ASCII plain text file entitled 221028-P2638USPC-TPTO-REPLACEMENT 10282022 SEQ ID LIST ST25, with a date of creation of Oct. 28, 2022, and a size of 22 KB is hereby incorporated by reference in its entirety.

DESCRIPTION OF THE INVENTION

1) In a first embodiment the invention provides a host cell that is capable of producing D-ribulose and that is incapable of or has a reduced capability of converting D-ribulose to a molecule other than ribitol, wherein the host cell comprises a heterologous nucleic acid sequence encoding a polypeptide capable of converting D-ribulose to ribitol with a cofactor preference for NADPH.

A host cell that is capable of producing D-ribulose and that is incapable of or has a reduced capability of converting D-ribulose to a molecule other than ribitol can either occur naturally or can be engineered, such as especially genetically engineered, to have these properties. There are well-known ways how this can be achieved. These include in non-limiting examples introducing a heterologous gene or genes in a vector, wherein the heterologous gene or genes are integrated into the host cell chromosome, or are maintained episomally. In other embodiments, genes native to the host cell can be altered (which includes but is not limited to the deletion of genes) and particularly specifically altered using for example homologous recombination that can enable the host cell to produce D-ribulose and/or that reduce or eliminate the capability of the host cell to convert D-ribulose to a molecule other than ribitol.

As used herein, by "host cell" is meant a prokaryotic or eukaryotic cell, preferably selected from bacteria, fungi, and especially yeast.

As used herein, the expression "incapable of or has a reduced capability of converting D-ribulose to a molecule other than ribitol" means that the molar ratio between the non-ribitol molecule(s) produced by conversion from D-ribulose and ribitol produced by conversion from D-ribulose is less than 1. Preferably the molar percentage of ribitol produced by conversion from D-ribulose compared to the total quantity of molecules produced by conversion from D-ribulose is greater than 50%, especially greater than 60%, more preferably greater than 75%, especially greater than 85%, such as especially greater than 90%, most preferably greater than 95%, especially greater than 98%. In a preferred embodiment the host cell is incapable of converting D-ribulose to a molecule other than ribitol, i.e. the molar percentage of ribitol produced by conversion from D-ribulose compared to the total quantity of molecules produced by conversion from D-ribulose is 100%.

The terms "converting", "convert(s)", "converted", or "conversion" as used herein generally have the meaning that a molecule is produced from another molecule in a single chemical step, especially by enzymatic conversion.

"Heterologous", as used herein, is understood to mean that a gene or encoding nucleic acid sequence has been introduced into the cell by genetic engineering. It can be present in episomal or chromosomal form. The gene or encoding nucleic acid sequence can originate from a source different from the host cell in which it is introduced. However, it can also come from the same species as the host cell in which it is introduced but it is considered heterologous due to its environment which is not natural. For example, the gene or encoding nucleic acid sequence is referred to as heterologous because it is under the control of a promoter which is not its natural promoter or it is introduced at a location which differs from its natural location. The host cell may contain an endogenous copy of the gene or encoding nucleic acid sequence prior to introduction of the heterologous gene or encoding nucleic acid sequence or it may not contain an endogenous copy.

The expression "polypeptide capable of converting D-ribulose to ribitol with a cofactor preference for NADPH" as used herein means that the polypeptide capable of converting D-ribulose to ribitol has a preference of using the cofactor NADPH over another cofactor, especially over the cofactor NADH, preferably over another cofactor that occurs in the host cell, especially in biologically relevant concentrations. Preferably the expression "a polypeptide capable of converting D-ribulose to ribitol with a cofactor preference for NADPH" as used herein refers to a polypeptide capable of converting D-ribulose to ribitol which uses NADPH as cofactor compared to any other cofactor, especially compared to NADH, preferably compared to any other cofactor that occurs in the host cell, especially in biologically relevant concentrations, to an extent that is greater than 50%, especially greater than 60%, more preferably greater than 75%, especially greater than 85%, such as especially greater than 90%, most preferably greater than 95%, especially greater than 98% of the sum of the extent to which NADPH and the cofactor to compare with is used. To what extent the polypeptide capable of converting D-ribulose to ribitol is using a particular cofactor can be determined by measuring the catalytic efficiency ($k_{cat}/K_m$) of the polypeptide for the oxidation of the cofactor. This can for example be measured as described in Ehrensberger et al., Structure-Guided Engineering of Xylitol Dehydrogenase Cosubstrate Specificity. Structure 14, 567-575, March 2006 using D-ribulose instead of xylitol and NADH, NADPH, or any other cofactor in reduced form instead of $NAD^+$ or $NADP^+$. The production of the oxidized cofactor can be measured by methods known in the art such as e.g. for $NAD^+$ and $NADP^+$ by measuring the decrease in absorbance at 340 nm corresponding to the oxidation of NAD(P)H to $NAD(P)^+$.

Polypeptides that are capable of converting D-ribulose to ribitol with a cofactor preference for NADPH and nucleic acid sequences encoding such polypeptides are disclosed herein generically and specifically. Moreover, a person of ordinary skill in the art is able to generate various further different polypeptides, and the respective nucleic acid sequences encoding such polypeptides, that are capable of converting D-ribulose to ribitol with a cofactor preference for NADPH. For example, a person skilled in the art can introduce mutations to e.g. naturally occurring dehydrogenases/reductases that are capable of converting D-ribulose to ribitol and that have a cofactor preference for NADH, by sequence mutagenesis that lead to a switch in the cofactor preference from NADH to NADPH. Such mutations include, but are not limited to, mutations that correspond to those disclosed in e.g. Ehrensberger et al., Structure-Guided Engineering of Xylitol Dehydrogenase Cosubstrate Specificity. Structure 14, 567-575, March 2006.

The capability of a polypeptide to convert D-ribulose to ribitol can be measured by determining the kinetic parameters such as $K_m$, $k_{cat}$, and $k_{cat}/K_m$ of the reaction according to methods known in the art, such as described in Ehrensberger et al., Structure-Guided Engineering of Xylitol Dehydrogenase Cosubstrate Specificity. Structure 14, 567-575, March 2006, wherein $k_{cat}$ for the conversion of D-ribulose to ribitol can also be measured by determining the $k_{cat}$ for the oxidation of the cofactor. Preferably a polypeptide capable of converting D-ribulose to ribitol with a cofactor preference for NADPH converts D-ribulose to ribitol with NADPH as cofactor with an activity (especially determined by measuring $k_{cat}$) of at least 20%, preferably of at least 30%, especially of at least 50%, more preferably of at least 75%, most preferably of at least 100% of the activity of the polypeptide with the amino acid sequence set forth in SEQ ID NO 11.

When stated herein that a host cell comprises a nucleic acid sequence encoding a polypeptide or a gene encoding a polypeptide this means that the nucleic acid sequence or gene is under the control of one or more regulatory sequences suitable for expressing the polypeptide. For the nucleic acid sequence encoding a polypeptide capable of converting D-ribulose to ribitol with a cofactor preference for NADPH the regulatory sequence is especially a promoter which drives high expression of the polypeptide.

2) A further embodiment of the invention relates to the host cell of embodiment 1), wherein the host cell is capable of producing D-ribulose from D-glucose.

3) A further embodiment of the invention relates to the host cell of embodiment 1) or 2), wherein the host cell is capable of producing D-ribulose from D-glucose via the pentose phosphate pathway.

4) A further embodiment of the invention relates to the host cell of any one of embodiments 1)-3), wherein the host cell is incapable of or has a reduced capability of converting D-ribulose to D-arabitol.

For clarification, the expression "incapable of or has a reduced capability of converting D-ribulose to D-arabitol" means that the molar ratio between D-arabitol produced by conversion from D-ribulose and ribitol produced by conversion from D-ribulose is less than 1. Preferably the molar percentage of ribitol produced by conversion from D-ribulose compared to the total quantity of D-arabitol and ribitol produced by conversion from D-ribulose is greater than 50%, especially greater than 60%, more preferably greater than 75%, especially greater than 85%, such as especially greater than 90%, most preferably greater than 95%, especially greater than 98%. In a preferred embodiment the host cell is incapable of converting D-ribulose to D-arabitol, i.e. the molar percentage of ribitol produced by conversion from D-ribulose compared to the total quantity of D-arabitol and ribitol produced by conversion from D-ribulose is 100%.

5) A further embodiment of the invention relates to the host cell of any one of embodiments 1)-4), wherein the host cell is a fungal cell.

6) A further embodiment of the invention relates to the host cell of embodiment 5), wherein the fungal cell is a yeast cell.

7) A further embodiment of the invention relates to the host cell of embodiment 6), wherein the yeast cell is *Pichia ohmeri*.

8) A further embodiment of the invention relates to the host cell of any one of embodiments 1)-7), wherein the host cell comprises one or more endogenous genes encoding a polypeptide that is capable of converting D-ribulose to D-arabitol and wherein said endogenous gene(s) is/are modified so that the expression and/or activity of said polypeptide is reduced or eliminated.

As used herein, the expression "so that the expression of said polypeptide is reduced" means that the level of expression of the polypeptide that is capable of converting D-ribulose to D-arabitol is reduced compared to the host cell with the unmodified endogenous gene. Preferably the level of expression of the polypeptide compared to that in the host cell with the unmodified endogenous gene(s) is reduced by 20% or more, especially 40% or more, more preferably 50% or more, especially 70% or more, such as especially 90% or more, even more preferably 95% or more, especially 98% or more. Most preferably the expression is eliminated, i.e. the polypeptide that is capable of converting D-ribulose to D-arabitol is no longer expressed.

A reduction of the activity of the polypeptide, on the other hand, means that the polypeptide has a reduced capability of converting D-ribulose to D-arabitol compared to the polypeptide encoded by the unmodified endogenous gene. The capability of a polypeptide to convert D-ribulose to D-arabitol can be measured by determining the kinetic parameters such as $K_m$, $k_{cat}$, and $k_{cat}/K_m$ of the reaction according to methods known in the art, such as described in Ehrensberger et al., Structure-Guided Engineering of Xylitol Dehydrogenase Cosubstrate Specificity. Structure 14, 567-575, March 2006, wherein $k_{cat}$ for the conversion of D-ribulose to D-arabitol can also be measured by determining the $k_{cat}$ for the oxidation of the cofactor. Preferably the activity (especially determined by measuring $k_{cat}$) of the polypeptide to convert D-ribulose to D-arabitol compared to the polypeptide encoded by the unmodified endogenous gene is reduced by 20% or more, especially 40% or more, more preferably 50% or more, especially 70% or more, such as especially 90% or more, even more preferably 95% or more, especially 98% or more. Most preferably the activity is eliminated, i.e. the polypeptide is no longer capable of converting D-ribulose to D-arabitol.

Methods of modifying a gene so that the expression or activity of the polypeptide encoded by the gene is reduced or eliminated are well-known in the art. A reduction of the expression of the polypeptide can for example be achieved by altering the promoter of the gene that encodes the polypeptide by e.g. replacing the promoter by a less active promoter via homologous recombination. An elimination of the expression of the polypeptide on the other hand can be achieved by e.g. deleting the gene that encodes the polypeptide by for example replacing the gene with a selection marker via homologous recombination. A reduction or elimination of the activity of the polypeptide that is capable of converting D-ribulose to D-arabitol can for example be achieved by replacing the endogenous gene by a mutated gene via homologous recombination wherein the mutated gene encodes a polypeptide whose activity of converting D-ribulose to D-arabitol is reduced or eliminated. In another example, the activity of the polypeptide that is capable of converting D-ribulose to D-arabitol may be reduced or eliminated by growing the host cell that expresses the polypeptide in the presence of an inhibitor of the polypeptide, or by co-expressing or co-producing an inhibitor of the polypeptide.

9) A further embodiment of the invention relates to the host cell of embodiment 8), wherein the endogenous gene or genes encoding a polypeptide that is capable of converting D-ribulose to D-arabitol is/are inactivated through deletion of the gene(s).

Inactivation of an endogenous gene or genes through deletion is a particular way of eliminating the expression of the polypeptide that is capable of converting D-ribulose to D-arabitol. Methods for the inactivation of a gene through deletion are well-known in the art such as for example the method of homologous recombination with a nucleotide sequence lacking the gene. One particular method is described further below under Examples.

10) A further embodiment of the invention relates to the host cell of any one of embodiments 1)-9), wherein the polypeptide capable of converting D-ribulose to ribitol with a cofactor preference for NADPH is a ribitol dehydrogenase, or a catalytically active portion thereof, mutated for changing the cofactor preference from NADH to NADPH.

In a preferred embodiment the ribitol dehydrogenase is from *Enterobacter aerogenes*, *Escherichia coli*, or *Rhodobacter sphaeroides*, such as especially from *Enterobacter aerogenes* and/or *Escherichia coli*.

11) A further embodiment of the invention relates to the host cell of any one of embodiments 1)-9), wherein the polypeptide capable of converting D-ribulose to ribitol with a cofactor preference for NADPH comprises or consists of a polypeptide having at least 70%, at least 75%, at least 80%, at least 85%, at least 90%, or at least 95% sequence identity to a polypeptide with the amino acid sequence set forth in SEQ ID NO 7 or a catalytically active portion thereof.

The expression "or a catalytically active portion thereof" as used herein refers to any portion of an indicated amino acid sequence [in case of present embodiment 11) the indicated amino acid sequence is SEQ ID NO 7] provided the polypeptide consisting of such portion of an amino acid sequence remains capable of converting D-ribulose to ribitol with a cofactor preference for NADPH.

A person skilled in the art knows how to produce polypeptides that comprise or consist of a polypeptide having certain sequence identities to a given polypeptide or a portion thereof by e.g. modifying a nucleic acid sequence encoding the given polypeptide through nucleotide exchanges, deletions and/or additions using known techniques. The polypeptides encoded by such modified nucleic acid sequences can be produced by known methods, such as e.g. heterologous expression in a host cell and purification of the expressed polypeptide, and tested for their capability to convert D-ribulose to ribitol and their cofactor preference for NADPH using methods known in the art, such as especially the methods described herein above. Moreover, which portions/amino acids of the polypeptide are needed for the conversion of D-ribulose to ribitol and the cofactor preference for NADPH are known (see e.g. Ehrensberger et al., Structure-Guided Engineering of Xylitol Dehydrogenase Cosubstrate Specificity. Structure 14, 567-575, March 2006; and Ghosh, D. et al., The refined three-dimensional structure of 3α,20β-hydroxysteroid dehydrogenase and possible roles of the residues conserved in short-chain dehydrogenases. Structure 2, 629-640, 1994) and can be determined through known techniques.

12) A further embodiment of the invention relates to the host cell of embodiment 11), wherein the polypeptide capable of converting D-ribulose to ribitol with a cofactor preference for NADPH comprises the two amino acids corresponding to the amino acids S45 and R46 of SEQ ID NO 7.

13) A further embodiment of the invention relates to the host cell of embodiment 11), wherein the polypeptide capable of converting D-ribulose to ribitol with a cofactor preference for NADPH comprises or consists of a polypeptide having the amino acid sequence set forth in SEQ ID NO 7 or a catalytically active portion thereof.

14) A further embodiment of the invention relates to the host cell of any one of embodiments 1)-9), wherein the polypeptide capable of converting D-ribulose to ribitol with a cofactor preference for NADPH comprises or consists of a polypeptide having at least 70%, at least 75%, at least 80%, at least 85%, at least 90%, or at least 95% sequence identity to a polypeptide with the amino acid sequence set forth in SEQ ID NO 9 or a catalytically active portion thereof.

15) A further embodiment of the invention relates to the host cell of embodiment 14), wherein the polypeptide capable of converting D-ribulose to ribitol with a cofactor preference for NADPH comprises the two amino acids corresponding to the amino acids S45 and R46 of SEQ ID NO 9.

16) A further embodiment of the invention relates to the host cell of embodiment 14), wherein the polypeptide capable of converting D-ribulose to ribitol with a cofactor preference for NADPH comprises or consists of a polypeptide having the amino acid sequence set forth in SEQ ID NO 9 or a catalytically active portion thereof.

17) A further embodiment of the invention relates to the host cell of any one of embodiments 1)-9), wherein the polypeptide capable of converting D-ribulose to ribitol with a cofactor preference for NADPH comprises or consists of a polypeptide having at least 70%, at least 75%, at least 80%, at least 85%, at least 90%, or at least 95% sequence identity to a polypeptide with the amino acid sequence set forth in SEQ ID NO 11 or a catalytically active portion thereof.

18) A further embodiment of the invention relates to the host cell of embodiment 17), wherein the polypeptide capable of converting D-ribulose to ribitol with a cofactor preference for NADPH comprises the two amino acids corresponding to the amino acids S38 and R39 of SEQ ID NO 11.

19) A further embodiment of the invention relates to the host cell of embodiment 17), wherein the polypeptide capable of converting D-ribulose to ribitol with a cofactor preference for NADPH comprises or consists of a polypeptide having the amino acid sequence set forth in SEQ ID NO 11 or a catalytically active portion thereof.

20) A further embodiment of the invention relates to the host cell of any one of embodiments 1)-9), wherein the host cell comprises more than one copy of a heterologous nucleic acid sequence encoding a polypeptide capable of converting D-ribulose to ribitol with a cofactor preference for NADPH.

21) A further embodiment of the invention relates to the host cell of embodiment 20), wherein each copy of the heterologous nucleic acid sequence encodes a polypeptide of any one of embodiments 10)-19).

22) A further embodiment of the invention relates to the host cell of embodiment 20), wherein the host cell comprises at least one, such as only one, copy of a heterologous nucleic acid sequence encoding a polypeptide of any one of embodiments 11)-13), such as especially embodiment 12), and at least one, such as only one, copy of a heterologous nucleic acid sequence encoding a polypeptide of any one of embodiments 14)-16), such as especially embodiment 15).

23) A further embodiment of the invention relates to a method for producing ribitol comprising culturing a host cell of any one of embodiments 1)-22) under cell culture conditions wherein ribitol is produced by the host cell, and optionally isolating the produced ribitol.

The term "isolating" as used herein refers to any process that increases the purity of the compound concerned. Purification methods are well-known in the art and include for example centrifugation, filtration, chromatography, crystallization, liquid-liquid extraction, etc.

For example, ribitol can be produced according to this invention by culturing *Pichia ohmeri* in D-glucose containing media wherein ribitol is present in the supernatant and can be isolated by e.g. separating the yeast cells from the supernatant by centrifugation or ultra-centrifugation and purifying ribitol from the supernatant by chromatography.

24) A further embodiment of the invention relates to the method of embodiment 23), further comprising converting the produced ribitol to L-ribulose, and optionally isolating the obtained L-ribulose.

As provided herein, ribitol produced according to the inventive methods can be converted to L-ribulose by any method known to one of ordinary skill in the art without the exercise of undue experimentation using conventional and routine methods and techniques.

For example, ribitol can be converted to L-ribulose as described in Moses and Ferrier, The biochemical preparation of D-xylulose and L-ribulose. Details of the action of *Acetobacter* suboxydans on D-arabitol, ribitol and other polyhydroxy compounds. Biochem J. 1962 April; 83: 8-14 or as described in Ahmed et al., Biochemical preparation of L-ribose and L-arabinose from ribitol: a new approach. J Biosci Bioeng. 1999; 88(4): 444-448.

Alternatively, ribitol can be converted to L-ribulose using the following process:

Wildtype *Gluconobacter oxydans* biomass is generated via fermentation. The cells are separated from the supernatant via centrifugation or ultra-filtration and are used in a bioconversion reaction. Ribitol containing supernatant, obtainable from the process of embodiment 23) after separation from the cells via e.g. centrifugation or ultra-centrifugation, is mixed with the *Gluconobacter oxydans* cells and agitated in a fermenter.

The *Gluconobacter oxydans* cells convert ribitol to L-ribulose during this incubation. After the conversion, the biomass and the L-ribulose containing supernatant can be separated by centrifugation or ultra-filtration.

25) A further embodiment of the invention relates to the method of embodiment 24), further comprising converting the produced L-ribulose to L-arabinose.

L-Arabinose is one of the pentoses that occur in nature. It has a specific inhibitory effect on intestinal sucrase activity and can be used as sweetener or dietary supplement. Additionally, it can be used in medical and pharmaceutical applications for the treatment of diseases such as diabetes and chronic constipation.

As provided herein, L-ribulose produced from ribitol produced according to the inventive methods can be converted to L-arabinose by any method known to one of ordinary skill in the art without the exercise of undue experimentation using conventional and routine methods and techniques.

L-Ribulose can for example be converted to L-arabinose as described in Ahmed et al., Biochemical preparation of L-ribose and L-arabinose from ribitol: a new approach. J Biosci Bioeng. 1999; 88(4): 444-448 by using an L-arabinose isomerase.

Alternatively, L-ribulose can be converted to L-arabinose using the following process:

*Escherichia coli* cells expressing an L-arabinose isomerase are fermented to generate biomass. The cells are separated from the supernatant via centrifugation or ultra-filtration and are used in a bioconversion reaction.

L-Ribulose containing supernatant that can be obtained as described above under embodiment 24) is mixed with the *Escherichia coli* cells expressing an L-arabinose isomerase and agitated in a fermenter.

*Escherichia coli* cells expressing the L-arabinose isomerase are converting L-ribulose to L-arabinose. After the conversion, the biomass and supernatant can be separated by centrifugation or ultra-filtration wherein L-arabinose is present in the supernatant.

26) A further embodiment of the invention relates to the method of embodiment 23), further comprising producing L-arabinose from the produced ribitol in one or more steps.

The expression "producing L-arabinose from the produced ribitol in one or more steps" means that L-arabinose is produced from ribitol in one or more, such as e.g. one or two, chemical or process steps.

L-Arabinose can for example be prepared in a two-step biochemical reaction from ribitol via L-ribulose wherein each reaction is performed in a separate process step as described in Ahmed et al., Biochemical preparation of L-ribose and L-arabinose from ribitol: a new approach. J Biosci Bioeng. 1999; 88(4): 444-448 or as described above under embodiments 24) and 25).

Alternatively, the two biochemical reaction steps may be combined in one process step by for example using a host cell that is, e.g. through genetic modification, capable of both converting ribitol to L-ribulose and L-ribulose to L-arabinose in that, for example, the host cell expresses a polypeptide that is capable of converting ribitol to L-ribulose and a polypeptide that is capable of converting L-ribulose to L-arabinose.

27) A further embodiment of the invention relates to the method of embodiment 25) or 26), further comprising isolating the produced L-arabinose.

As described above under embodiment 23), methods for isolating a molecule are well-known in the art. In particular, L-arabinose produced from ribitol produced according to the inventive methods can be isolated by any method known to one of ordinary skill in the art without the exercise of undue experimentation using conventional and routine methods and techniques. For example, L-arabinose can be isolated by separating the cells from the supernatant that contains L-arabinose via ultrafiltration and by subjecting the supernatant to ion exchange chromatography followed by decolourization and crystallisation of L-arabinose.

28) A further embodiment of the invention relates to the method of embodiment 24), further comprising converting the produced L-ribulose to L-ribose.

L-Ribose is a potential starting material for many L-nucleoside pharmaceuticals that can be used as antiviral agents.

As provided herein, L-ribulose produced from ribitol produced according to the inventive methods can be converted to L-ribose by any method known to one of ordinary skill in the art without the exercise of undue experimentation using conventional and routine methods and techniques.

L-Ribulose can for example be converted to L-ribose as described in Ahmed et al., Biochemical preparation of L-ribose and L-arabinose from ribitol: a new approach. J Biosci Bioeng. 1999; 88(4): 444-448 by using an L-ribose isomerase.

Alternatively, L-ribulose can be converted to L-ribose using the following process:

*Escherichia coli* cells expressing an L-ribose isomerase are fermented to generate biomass. The cells are separated from the supernatant via centrifugation or ultra-filtration and are used in a bioconversion reaction.

L-Ribulose containing supernatant that can be obtained as described above under embodiment 24) is mixed with the *Escherichia coli* cells expressing an L-ribose isomerase and agitated in a fermenter.

*Escherichia coli* cells expressing the L-ribose isomerase are converting L-ribulose to L-ribose. After the conversion, the biomass and supernatant can be separated by centrifugation or ultra-filtration wherein L-ribose is present in the supernatant.

29) A further embodiment of the invention relates to the method of embodiment 23), further comprising producing L-ribose from the produced ribitol in one or more steps.

The expression "producing L-ribose from the produced ribitol in one or more steps" means that L-ribose is produced from ribitol in one or more, such as e.g. one or two, chemical or process steps.

L-Ribose can for example be prepared in a two-step biochemical reaction from ribitol via L-ribulose wherein each reaction is performed in a separate process step as described in Ahmed et al., Biochemical preparation of L-ribose and L-arabinose from ribitol: a new approach. J Biosci Bioeng. 1999; 88(4): 444-448 or as described above under embodiments 24) and 28).

Alternatively, the two biochemical reaction steps may be combined in one process step by for example using a host cell that is, e.g. through genetic modification, capable of both converting ribitol to L-ribulose and L-ribulose to L-ribose in that, for example, the host cell expresses a polypeptide that is capable of converting ribitol to L-ribulose and a polypeptide that is capable of converting L-ribulose to L-ribose.

30) A further embodiment of the invention relates to the method of embodiment 28) or 29), further comprising isolating the produced L-ribose.

As described above under embodiment 23), methods for isolating a molecule are well-known in the art. In particular, L-ribose produced from ribitol produced according to the inventive methods can be isolated by any method known to one of ordinary skill in the art without the exercise of undue experimentation using conventional and routine methods and techniques. For example, L-ribose can be isolated by separating the cells from the supernatant that contains L-ribose via ultrafiltration and by subjecting the supernatant to ion exchange chromatography followed by decolourization and crystallisation of L-ribose.

31) A further embodiment of the invention relates to the use of a host cell of any one of embodiments 1)-22) for producing ribitol, L-ribulose, L-arabinose, or L-ribose.

EXAMPLES

Example 1. Cloning of the Ribitol Dehydrogenase Genes from *Enterobacter aerogenes*, *Escherichia coli* and *Rhodobacter sphaeroides*

A DNA fragment encoding the dehydrogenase ABY61_23105 from *E. aerogenes* (SEQ ID NO 1) was chemically synthesized by GeneArt Gene Synthesis (Thermo Fisher Scientific, Regensburg, Germany) according to the submitted sequence (SEQ ID NO 2) based on nucleotides 4,925,718 to 4,926,467 of sequence CPO 11574.1 coding for the ABY61_23105 gene.

A DNA fragment encoding the ribitol dehydrogenase G2583_2620 from *E. coli* (SEQ ID NO 3) was chemically synthesized by GeneArt Gene Synthesis (Thermo Fisher Scientific, Regensburg, Germany) according to the submitted sequence (SEQ ID NO 4) based on nucleotides 2,632,596 to 2,633,345 of sequence CP001846.1 coding for the G2583_2620 gene.

A DNA fragment encoding the oxidoreductase RSP03_RS18040 from *R. sphaeroides* (SEQ ID NO 5) was chemically synthesized by GeneArt Gene Synthesis (Thermo Fisher Scientific, Regensburg, Germany) according to the submitted sequence (SEQ ID NO 6) based on nucleotides 18,838 to 19,566 of sequence NZ_BJXO01000022.1 coding for the RSP03_RS18040 gene.

For all DNA fragments described above, additional nucleotides coding for the restriction sites of AscI and SphI were included at the respective 5' and 3' ends, in order to facilitate further cloning. Furthermore, an adenosine triplet was included in front of the start ATG to account for an adenosine at the minus 3 position in the Kozak-like sequence of yeasts.

The synthesized DNA fragments were delivered as lyophilized DNA in *E. coli* propagation vectors pMK-RQ or pMA-T. A *P. ohmeri* vector containing a ribulose reductase promoter and terminator, CEN-ARS and LEU2 selection marker as well as an origin of replication and ampicillin resistance gene for propagation in *E. coli* was used for overexpression of the ribitol dehydrogenase genes from *E. aerogenes*, *E. coli* and *R. sphaeroides*. For cloning into the expression vector, the respective DNA fragments were released from the pMK-RQ or pMA-T vectors by cutting with AscI and SphI restriction enzymes (New England Biolabs, Ipswich, Massachusetts).

The fragments (764 bp, 764 bp and 743 bp, respectively) were gel-purified using Zymoclean Gel DNA Recovery Kit (Zymo Research Corporation, Irvine, California) and ligated for 1 h at room temperature to the AscI/SphI-digested and gel-purified vector backbone using T4 DNA ligase (New England Biolabs, Ipswich, Massachusetts). After transformation of XL10 Gold ultracompetent cells (Agilent Technologies, Santa Clara, California) with the ligation mixture, plasmid DNA was isolated using the Zyppy Plasmid Miniprep Kit (Zymo Research Corporation, Irvine, California) and verified by sequencing (Microsynth, Balgach, Switzerland).

Resulting plasmids pEV26597, pEV26599 and pEV26600 contain the ribitol dehydrogenases from *E. aerogenes* (Ea_RDH), *E. coli*(Ec_RDH) and *R. sphaeroides* (Rs_RDH), respectively.

Additionally, all ribitol dehydrogenases have been mutated for changing the cofactor preference from NAD to NADP based on a publication by Ehrensberger et al., Structure-Guided Engineering of Xylitol Dehydrogenase Cosubstrate Specificity. Structure 14, 567-575, March 2006. Residues Asp45 in Ea_RDH and Ec_RDH as well as Asp38 in Rs_RDH were replaced by a serine.

To generate the Ea_mRDH_D45S mutant (SEQ ID NO 7 and SEQ ID NO 8), the corresponding wild type gene was subjected to PCR amplification using primer pairs EVPR13970/EVPR13974 (SEQ ID NO 13 and SEQ ID NO 14) and EVPR13973/EVPR13388 (SEQ ID NO 15 and SEQ ID NO 16), followed by overlap extension PCR with primers EVPR13970/EVPR13388 (SEQ ID NO 13 and SEQ ID NO 16). The resulting fragment was subcloned into the same vector used for cloning of expressing of wild type ribitol dehydrogenases by restriction digestion with restriction enzymes AscI and SphI (New England Biolabs, Ipswich, Massachusetts), followed by ligation and verification as described above.

For generating the Ec_mRDH_D45S mutant (SEQ ID NO 9 and SEQ ID NO 10), the corresponding wild type gene was subjected to PCR amplification using primer pairs EVPR13970/EVPR13974 (SEQ ID NO 13 and SEQ ID NO 14) and EVPR13973/EVPR13388 (SEQ ID NO 15 and SEQ ID NO 16), followed by overlap extension PCR with primers EVPR13970/EVPR13388 (SEQ ID NO 13 and SEQ ID NO 16). The resulting fragment was subcloned into the same vector used for cloning of expressing of wild type ribitol dehydrogenases by restriction digestion with enzymes AscI and SphI (New England Biolabs, Ipswich, Massachusetts), followed by ligation and verification as described above.

For generating the Rs_mRDH_D38S mutant (SEQ ID NO 11 and SEQ ID NO 12), the corresponding wild type gene was subjected to PCR amplification using primer pairs EVPR13970/EVPR13976 (SEQ ID NO 13 and SEQ ID NO 17) and EVPR13975/EVPR13388 (SEQ ID NO 18 and SEQ ID NO 16), followed by overlap extension PCR with primers EVPR13970/EVPR13388 (SEQ ID NO 13 and SEQ ID NO 16). The resulting fragment was subcloned into the same vector used for cloning of expressing of wild type ribitol dehydrogenases by restriction digestion with enzymes AscI and SphI (New England Biolabs, Ipswich, Massachusetts), followed by ligation and verification as described above.

Resulting plasmids pEV26672, pEV26675 and pEV26676 contain the mutated ribitol dehydrogenases from *E. aerogenes* (Ea_mRDH_D45S), *E. coli* (Ec_mRDH_D45S) and *R. sphaeroides* (Rs_RDH_D38S), respectively.

Example 2. Deletion of the Arabinitol 2-Dehydrogenase Gene in *P. ohmeri*

In order to redirect the flux in the pentose phosphate pathway from D-arabitol to ribitol, deletion of the arabinitol 2-dehydrogenase, which converts D-ribulose to D-arabitol, was performed. For this purpose, a plasmid containing 5' and 3' genomic homologous regions of the arabinitol 2-dehydrogenase flanking a LEU2 selection marker was constructed.

The 5' homologous region of the arabinitol 2-dehydrogenase gene was amplified from genomic DNA of *P. ohmeri* using primer EV5302 (SEQ ID NO 19) containing a PstI site and EV5305 (SEQ ID NO 20) containing a SalI site. The genomic DNA template was prepared by resuspending a freshly streaked out colony in 30 µl of 0.2% SDS and heating for 4 min at 95° C. After centrifugation, 0.5 µl of the supernatant was used as PCR template. PCR amplification was performed in a reaction mix consisting of 200 µM of dNTP mix and 0.5 µM of each primer with 0.02 U/µl of iProof polymerase (BIO-RAD, Hercules, California) in 1× buffer. The PCR was accomplished with an initial denaturation step of 30 sec at 98° C. followed by 30 cycles of 10 sec at 98° C., 30 sec at 58° C. and 50 sec at 72° C., and a final extension step of 7 min at 72° C. The PCR product was separated on a 1.5% agarose gel, extracted and purified using the Zymoclean Gel DNA Recovery Kit (Zymo Research Corporation, Irvine, California). The 743 bp PCR fragment was restriction digested with PstI and SalI enzymes (New England Biolabs, Ipswich, Massachusetts) and ligated for 1 h at room temperature to the backbone of the a vector containing a LEU2 selection marker flanked by two loxP sites, linearized with PstI and SalI restriction enzymes (New England Biolabs, Ipswich, Massachusetts) and gel-purified with Zymoclean Gel DNA Recovery Kit (Zymo Research Corporation, Irvine, California) using T4 DNA ligase (New England Biolabs, Ipswich, Massachusetts). After transformation into XL10 Gold ultracompetent cells (Agilent Technologies, Santa Clara, California) with the ligation mixture, plasmid DNA was isolated using the Zyppy Plasmid Miniprep Kit (Zymo Research Corporation, Irvine, California) and verified by sequencing (Microsynth, Balgach, Switzerland). The resulting plasmid pEVE4916 contains a fragment homologous to the 5' region of the arabinitol 2-dehydrogenase and a LEU2 selection marker flanked by two loxP sites.

The 3' homologous region of the arabinitol 2-dehydrogenase was amplified from genomic DNA of *P. ohmeri* using primer EV5304 (SEQ ID NO 21) containing an NcoI site and EV5301 (SEQ ID NO 22) containing a SpeI site. The resulting 749 bp PCR product was restriction digested with NcoI and SpeI enzymes (New England Biolabs, Ipswich, Massachusetts) and ligated for 1 h at room temperature to the backbone of pEVE4916 linearized with NcoI and SpeI restriction enzymes (New England Biolabs, Ipswich, Massachusetts) and gel-purified with Zymoclean Gel DNA Recovery Kit (Zymo Research Corporation, Irvine, California) using T4 DNA ligase (New England Biolabs, Ipswich, Massachusetts). After transformation of XL10 Gold ultracompetent cells (Agilent Technologies, Santa Clara, California) with the ligation mixture, plasmid DNA was isolated using the Zyppy Plasmid Miniprep Kit (Zymo Research Corporation, Irvine, California) and verified by sequencing (Microsynth, Balgach, Switzerland). The resulting plasmid pEVE4998 contains 5' and 3' homologous regions of the arabinitol 2-dehydrogenase flanking a loxP-site flanked LEU2 selection marker.

For the deletion of the *P. ohmeri* arabinitol 2-dehydrogenase gene, plasmid pEVE4998 was restriction digested with NotI (New England Biolabs, Ipswich, Massachusetts) for 3 h at 37° C. and the product was cleaned up using Nucleo-Bond PC 20 column (Macherey-Nagel, Dueren, Germany).

A total of 10 µg of DNA was used to transform a *P. ohmeri* strain auxotrophic for leucine. Yeast transformation was carried out by the spheroplasting method of Green et al., 1999 with the following modifications: instead of Lyticase, Zymolyase 100T was used for the generation of spheroplasts and the incubation with the enzyme was performed at 37° C. until the monitored $OD_{600}$ of the cell suspension reduced to 25% of the original $OD_{600}$ before the Zymolyase treatment. Briefly, *P. ohmeri* cells were grown overnight at 30° C. in YPD medium (1% Yeast extract, 2% Peptone, 2% Dextrose) to a final $OD_{600}$ of 4. 200 $OD_{600}$ units were harvested by centrifugation, washed once with water and 1 M sorbitol, and resuspended in 3 ml SCE buffer (1 M sorbitol, 100 mM citric acid trisodium salt dihydrate, 10 mM EDTA, pH 5.8). DTT and Zymolase (LuBio Science, Luzern, Switzerland) were added to a final concentration of 10 mM and 0.5 U/OD, respectively and the mixture was then incubated at 37° C. with gentle shaking. The cell wall digestion was monitored by measuring the $OD_{600}$ of the cell suspension. When this value dropped to 25% of the original OD, the digestion was terminated by gentle centrifugation. Harvested spheroplasts were washed with 1 M sorbitol and STC buffer (1 M sorbitol, 10 mM Tris-HCl pH 7.5, 10 mM $CaCl_2$) and finally resuspended in 1 ml STC buffer containing 50 µg/ml calf-thymus DNA (Calbiochem/VWR, Dietikon, Switzerland). Aliquots of 100 µl spheroplasts were mixed with the DNA to be transformed and incubated for 10 min at room temperature. 1 ml PEG solution (20% PEG 8000, 10 mM Tris-HCl pH 7.5, 10 mM $CaCl_2$) was then added to the suspension, incubated for 10 min and pelleted down. Spheroplasts were regenerated at 30° C. for 1.5 h in 0.9 ml SOS medium (1 M sorbitol, 25% YPD, 7 mM $CaCl_2$). To the regenerated cells 5 ml of 50° C. warm top agar (0.67% yeast nitrogen base w/o amino acids, 0.2% Kaiser synthetic complete drop-out mixture, 2% glucose, 1 M sorbitol, 2.5% Noble-agar, pH 5.8) was added and the mixture was poured evenly onto pre-warmed, sorbitol containing selective plates (0.67% yeast nitrogen base w/o amino acids, 0.2% Kaiser synthetic complete drop-out mixture, 2% glucose, 1 M sorbitol, pH 5.8). Plates were incubated for 3 days at 30° C. Transformants were reselected on the appropriate selective plates.

Deletion of the arabinitol 2-dehydrogenase was confirmed by colony PCR.

The resulting strain EVST20048 contains the deletion of the arabinitol 2-dehydrogenase and is thus not able to produce any D-arabitol.

D-Arabitol titer of wild type and arabinitol 2-dehydrogenase deleted strains are depicted in Table 1.

TABLE 1

D-Arabitol titers of *P. ohmeri* strain deleted with arabinitol 2-dehydrogenase

| Strain | D-Arabitol (g/L) |
| --- | --- |
| Wild type | 20.6 ± 0.2 |
| EVST20048 | 0 |

Since the generated *P. ohmeri* strain deleted for the arabinitol 2-dehydrogenase is prototroph for leucine, removal of the LEU2 selection marker in EYS20048 is necessary for further modifications. Removal of the LEU2 selection marker was performed via the transformation of the strain with a CRE recombinase on an episomal plasmid according to the spheroplasting procedure described above. Removal of the LEU2 selection marker was confirmed by inviability on leucine drop-out plates.

The resulting strain is EVST20327 and is auxotrophic for leucine.

Example 3. Construction of *P. ohmeri* Strains Expressing the Ribitol Dehydrogenases

*P. ohmeri* strain EVST20327, previously described in Example 2 as an arabinitol 2-dehydrogenase deletion strain auxotrophic for leucine, and a wildtype strain still containing the arabinitol 2-dehydrogenase gene and auxotrophic for leucine were used as hosts for the generation of yeast strains able to produce ribitol upon transformation with plasmids pEV26597, pEV26599 and pEV26600.

Yeast transformations were carried out as described in Example 2.

Transformation of EVST20327 with plasmids pEV26597, pEV26599 and pEV26600 resulted in strains EVST24258, EVST24260 and EVST24261, respectively. Transformation of the wild type strain with plasmids pEV26597, pEV26599 and pEV26600 resulted in strains EVST24845, EVST24846 and EVST24847, respectively. As controls, the arabinitol 2-dehydrogenase deletion strain and the wild type strain, both transformed with an empty LEU2 plasmid were also generated leading to EVST22653 and EVST22686, respectively.

Each generated strain was tested in triplicates for ribitol production. For this purpose, clones were first grown at 37° C. overnight in seed media (0.67% yeast nitrogen base w/o amino acids, 0.2% Kaiser synthetic complete mixture, 5% glucose, pH 5.7). Out of this overnight culture a main culture in production media (0.67% yeast nitrogen base w/o amino acids, 0.2% Kaiser synthetic complete mixture, 25% glucose, pH 5.7) at a starting $OD_{600}$ of 0.1 was inoculated. This culture was grown at 37° C. for 96 h and the ribitol concentrations of the supernatants were determined by HPLC/RID using a Aminex HPX-87 column (Bio-Rad, Hercules, California) and a Waters TQ-Detector (Acquity UPLC linked to a triple quadrupole detector, Waters, Milford, Massachusetts) using isocratic conditions with water as mobile phase.

Ribitol titers of all tested strains are depicted in Table 2.

TABLE 2

Ribitol titers of *P. ohmeri* strains expressing ribitol dehydrogenases from *E. aerogenes*, *E. coli* and *R. sphaeroides*

| Strain | Ribitol (g/L) |
| --- | --- |
| EVST22653 | 18.5 ± 2.4 |
| EVST24258 | 52.2 ± 0.8 |
| EVST24260 | 45.6 ± 2.0 |
| EVST24261 | 29.6 ± 1.7 |
| EVST22686 | 4.5 ± 0.8 |
| EVST24845 | 6 ± 0.2 |
| EVST24846 | 6.1 ± 0.2 |
| EVST24847 | 5.6 ± 0.7 |

*P. ohmeri* strain EVST20327, previously described in Example 2 as an arabinitol 2-dehydrogenase deletion strain auxotrophic for leucine, and a wildtype strain still containing the arabinitol 2-dehydrogenase gene and auxotrophic for leucine were used as hosts for the generation of yeast strains able to produce ribitol upon transformation with plasmids pEV26672, pEV26675 and pEV26676, respectively.

Yeast transformations were carried out as described in Example 2.

Transformation of EVST20327 with plasmids pEV26672, pEV26675 and pEV26676 resulted in strains EVST24348, EVST24351 and EVST24352, respectively. Transformation of the wild type strain with plasmids pEV26672, pEV26675 and pEV26676 resulted in strains EVST24849, EVST24850 and EVST24851, respectively.

Each generated strain was tested in triplicates for ribitol production. The ribitol production was performed as described in above.

Ribitol titers of all tested strains are depicted in Table 3.

TABLE 3

Ribitol titers of *P. ohmeri* strains expressing mutated ribitol dehydrogenases from *E. aerogenes*, *E. coli* and *R. sphaeroides*

| Strain | Ribitol (g/L) |
| --- | --- |
| EVST24348 | 186.8 ± 4.6 |
| EVST24351 | 185 ± 1 |
| EVST24352 | 158.3 ± 5.2 |
| EVST24849 | 57.3 ± 0.5 |
| EVST24850 | 48.2 ± 1.8 |
| EVST24851 | 45.7 ± 3.7 |

Example 4. Integration of the Mutated Ribitol Dehydrogenase Genes in *P. ohmeri*

To integrate the mutated ribitol dehydrogenase genes from *E. aerogenes* and *E. coli* into the genome of *P. ohmeri*, integration vectors containing a ribulose reductase promoter and terminator, CEN-ARS and a LEU2 selection marker as well as an origin of replication and ampicillin resistance gene for propagation in *E. coli* were used.

The respective *E. aerogenes* mutated ribitol dehydrogenase was released from pEV26672 by cutting with AscI and SphI restriction enzymes (New England Biolabs, Ipswich, Massachusetts) followed by gel-purification using Zymoclean Gel DNA Recovery Kit (Zymo Research Corporation, Irvine, California) and ligated for 1 h at room temperature to the AscI/SphI-digested and gel-purified integration vector backbone using T4 DNA ligase (New England Biolabs, Ipswich, Massachusetts). The verification was conducted as described in Example 1.

The resulting plasmid pEV27141 carries the integration cassette of mutated ribitol dehydrogenase from *E. aerogenes*, flanked with ribulose reductase promoter and terminator of *P. ohmeri* and the LEU2 selection marker.

For the cloning of the mutated ribitol dehydrogenase from *E. coli*, the gene fragment was first cloned into a cloning vector containing a phosphoglycerate kinase promoter and a transketolase terminator of *P. ohmeri* and then subcloned into an integration vector containing CEN-ARS and a LEU2 selection marker, as well as an origin of replication and ampicillin resistance gene for propagation in *E. coli*. The respective DNA fragment was released from pEV26675 by cutting with AscI and SphI restriction enzymes (New England Biolabs, Ipswich, Massachusetts) and ligated for 1 h at room temperature to the AscI/SphI-digested and gel-purified cloning vector backbone using T4 DNA ligase (New England Biolabs, Ipswich, Massachusetts). The verification was carried out as described in Example 1. The resulting plasmid pEV28282 was subsequently cut with SpeI and SacII restriction enzymes (New England Biolabs, Ipswich, Massachusetts) and ligated for 1 h at room temperature to the SpeI/SacII-digested and gel-purified integration vector backbone using T4 DNA ligase (New England Biolabs, Ipswich, Massachusetts). The verification of ligation product was carried out as described in Example 1.

The resulting plasmid pEV28286 carries the integration cassette of the mutated ribitol dehydrogenase from *E. coli*, flanked with the phosphoglycerate kinase promoter and transketolase terminator of *P. ohmeri* and a LEU2 selection marker.

The leucine auxotrophic strain EVST20327 described in Example 2 was used as a host for the generation of a yeast strain able to produce ribitol by transformation with the NotI-digested pEV27141 plasmid, as described in Example 2, resulting into strain EVST24957.

The ribitol production was performed as described in Example 3 and is shown in Table 4.

To further improve the ribitol titer of the producing strain, one more copy of a mutated ribitol dehydrogenases was integrated.

Since the generated *P. ohmeri* strain EVSST24957 is prototrophic for leucine, removal of the LEU2 selection marker was necessary and was performed as described in Example 2.

The resulting strain EVST25893 auxotrophic for leucine was additionally transformed with the NotI-digested pEV28286 plasmid, as described in Example 2, resulting into strain EVST26201.

The ribitol production was performed as described in Example 3 and is shown in Table 4.

Additionally, strain EVST20327 was used as control.

TABLE 4

Ribitol titers of *P. ohmeri* strains deleted for the arabitol-2 dehydrogenase and expressing mutated ribitol dehydrogenases from *E. aerogenes* and *E. coli*

| Strain | Ribitol (g/L) |
|---|---|
| EVST20327 | 18 ± 3.3 |
| EVST24957 | 181.2 ± 9.6 |
| EVST26201 | 200.2 ± 2.5 |

These results show that increasing the copy number of integrated mutated ribitol dehydrogenase genes significantly improved the ribitol titer.

```
SEQUENCES
SEQ ID NO 1:
Amino acid sequence of the dehydrogenase from E. aerogenes
MNHSVSSMNTSLSGKVAAVTGAASGIGLECAKTLLGAGAKVVLIDREGEKLNKIVAELGENAFA

LQVDLMQGEQVDKIIDGILQLAGRLDIFHANAGAYIGGPVAEGDPDVWDRVLHLNTNAAFRCVR

SVLPHMIAQKSGDIIFTSSIAGVVPVIWEPIYTASKFAVQAFVHTTRRQVSQHGVRVGAVLPGPV

VTALLDDWPKEKMEEALANGSLMQPIEVAESVLFMVTRSKNVTVRDLVILPNSVDL

SEQ ID NO 2:
Nucleotide sequence encoding the dehydrogenase from E. aerogenes
ATGAACCACTCTGTTTCTTCTATGAACACCTCTTTGTCTGGTAAGGTTGCTGCTGTTACCGG

TGCTGCTTCTGGTATCGGTTTGGAGTGTGCTAAGACCTTGTTGGGTGCTGGTGCTAAGGTT

GTTTTGATCGACAGAGAGGGTGAGAAGTTGAACAAGATCGTTGCTGAGTTGGGTGAGAAC

GCTTTCGCTTTGCAGGTTGACTTGATGCAGGGTGAGCAGGTTGACAAGATCATCGACGGT

ATCTTGCAGTTGGCTGGTAGATTGGACATCTTCCACGCTAACGCTGGTGCTTACATCGGTG

GTCCAGTTGCTGAGGGTGACCCAGACGTTTGGGACAGAGTTTTGCACTTGAACACCAACG

CTGCTTTCAGATGTGTTAGATCTGTTTTGCCACACATGATCGCTCAGAAGTCTGGTGACATC

ATCTTCACCTCTTCTATCGCTGGTGTTGTTCCAGTTATCTGGGAGCCAATCTACACCGCTTC

TAAGTTCGCTGTTCAGGCTTTCGTTCACACCACCAGAAGACAGGTTTCTCAGCACGGTGTT
```

AGAGTTGGTGCTGTTTTGCCAGGTCCAGTTGTTACCGCTTTGTTGGACGACTGGCCAAAGG

AGAAGATGGAGGAGGCTTTGGCTAACGGTTCTTTGATGCAGCCAATCGAGGTTGCTGAGT

CTGTTTTGTTCATGGTTACCAGATCTAAGAACGTTACCGTTAGAGACTTGGTTATCTTGCCA

AACTCTGTTGACTTG

SEQ ID NO 3:
Amino acid sequence of ribitol dehydrogenase from *E. coli*
MNHSVPSMNTSLNGKVAAITGAASGIGLQCAKTLLEAGAKVVLIDREGEKLQKIVVELGENAYAL

QIDLFNGEQVDSMLARIVELAGGLDIFHANAGAYIGGPVAEGDPDIWDRVLNLNINAAFRCVRA

VLPHMIAQKSGDIIFTSSIAGVVPVIWEPIYTASKFAVQAFVHTTRRQVSQYGIRVGAVLPGPVVT

ALLDDWPKAKMDEALANGSLMQPIEVAESVLFMVTRSKNVTVRDLVILPNSVDL

SEQ ID NO 4:
Nucleotide sequence for encoding ribitol dehydrogenase from *E. coli*
ATGAACCACTCTGTTCCATCTATGAACACCTCTTTGAACGGTAAGGTTGCTGCTATCACCG

GTGCTGCTTCTGGTATCGGTTTGCAGTGTGCTAAGACCTTGTTGGAGGCTGGTGCTAAGGT

TGTTTTGATCGACAGAGAGGGTGAGAAGTTGCAGAAGATCGTTGTTGAGTTGGGTGAGAA

CGCTTACGCTTTGCAGATCGACTTGTTCAACGGTGAGCAGGTTGACTCTATGTTGGCTAGA

ATCGTTGAGTTGGCTGGTGGTTTGGACATCTTCCACGCTAACGCTGGTGCTTACATCGGTG

GTCCAGTTGCTGAGGGTGACCCAGACATCTGGGACAGAGTTTTGAACTTGAACATCAACG

CTGCTTTCAGATGTGTTAGAGCTGTTTTGCCACACATGATCGCTCAGAAGTCTGGTGACAT

CATCTTCACCTCTTCTATCGCTGGTGTTGTTCCAGTTATCTGGGAGCCAATCTACACCGCTT

CTAAGTTCGCTGTTCAGGCTTTCGTTCACACCACCAGAAGACAGGTTTCTCAGTACGGTAT

CAGAGTTGGTGCTGTTTTGCCAGGTCCAGTTGTTACCGCTTTGTTGGACGACTGGCCAAAG

GCTAAGATGGACGAGGCTTTGGCTAACGGTTCTTTGATGCAGCCAATCGAGGTTGCTGAG

TCTGTTTTGTTCATGGTTACCAGATCTAAGAACGTTACCGTTAGAGACTTGGTTATCTTGCC

AAACTCTGTTGACTTG

SEQ ID NO 5:
Amino acid sequence of ribitol oxidoreductase from *R. sphaeroides*
MAELMQGKVAAITGAASGIGLECARTLVAEGATVVLIDRAEDRLKALCAEIGPRALPLVVDLLDG

PQVSGMLPRILELAGSLDIFHANAGAYIGGQVAEGDPDAWDRMLNLNINAAFRSVHAVLPYMIE

RKSGDILFTSSVAGVVPVVWEPIYTASKFAVQAFVHSTRRQVAPHGVRVGAVLPGPVVTALLD

DWPKAKMEEALANGSLMQPKEVAEAVLFMLSRPKGVVIRDLVILPHSVDI

SEQ ID NO 6:
Nucleotide sequence for encoding oxidoreductase from *R. sphaeroides*
ATGGCTGAGTTGATGCAGGGTAAGGTTGCTGCTATCACCGGTGCTGCTTCTGGTATCGGTT

TGGAGTGTGCTAGAACCTTGGTTGCTGAGGGTGCTACCGTTGTTTTGATCGACAGAGCTGA

GGACAGATTGAAGGCTTTGTGTGCTGAGATCGGTCCAAGAGCTTTGCCATTGGTTGTTGAC

TTGTTGGACGGTCCACAGGTTTCTGGTATGTTGCCAAGAATCTTGGAGTTGGCTGGTTCTT

TGGACATCTTCCACGCTAACGCTGGTGCTTACATCGGTGGTCAGGTTGCTGAGGGTGACC

CAGACGCTTGGGACAGAATGTTGAACTTGAACATCAACGCTGCTTTCAGATCTGTTCACGC

TGTTTTGCCATACATGATCGAGAGAAAGTCTGGTGACATCTTGTTCACCTCTTCTGTTGCTG

GTGTTGTTCCAGTTGTTTGGGAGCCAATCTACACCGCTTCTAAGTTCGCTGTTCAGGCTTT

CGTTCACTCTACCAGAAGACAGGTTGCTCCACACGGTGTTAGAGTTGGTGCTGTTTTGCCA

GGTCCAGTTGTTACCGCTTTGTTGGACGACTGGCCAAAGGCTAAGATGGAGGAGGCTTTG

GCTAACGGTTCTTTGATGCAGCCAAAGGAGGTTGCTGAGGCTGTTTTGTTCATGTTGTCTA

GACCAAAGGGTGTTGTTATCAGAGACTTGGTTATCTTGCCACACTCTGTTGACATC

-continued

SEQ ID NO 7:
Amino acid sequence of D45S mutated dehydrogenase from E. aerogenes
MNHSVSSMNTSLSGKVAAVTGAASGIGLECAKTLLGAGAKVVLISREGEKLNKIVAELGENAFA

LQVDLMQGEQVDKIIDGILQLAGRLDIFHANAGAYIGGPVAEGDPDVWDRVLHLNTNAAFRCVR

SVLPHMIAQKSGDIIFTSSIAGVVPVIWEPIYTASKFAVQAFVHTTRRQVSQHGVRVGAVLPGPV

VTALLDDWPKEKMEEALANGSLMQPIEVAESVLFMVTRSKNVTVRDLVILPNSVDL

SEQ ID NO 8:
Nucleotide sequence encoding D45S mutated dehydrogenase from E. aerogenes
ATGAACCACTCTGTTTCTTCTATGAACACCTCTTTGTCTGGTAAGGTTGCTGCTGTTACCGG

TGCTGCTTCTGGTATCGGTTTGGAGTGTGCTAAGACCTTGTTGGGTGCTGGTGCTAAGGTT

GTTTTGATCTCTAGAGAGGGTGAGAAGTTGAACAAGATTTGTTGTTTGAGTTGGGTGAGAACG

CTTTCGCTTTGCAGGTTGACTTGATGCAGGGTGAGCAGGTTGACAAGATCATCGACGGTAT

CTTGCAGTTGGCTGGTAGATTGGACATCTTCCACGCTAACGCTGGTGCTTACATCGGTGGT

CCAGTTGCTGAGGGTGACCCAGACGTTTGGGACAGAGTTTTGCACTTGAACACCAACGCT

GCTTTCAGATGTGTTAGATCTGTTTTGCCACACATGATCGCTGAGAAGTGTGGTGAGATGAT

CTTCACCTCTTCTATCGCTGGTGTTGTTCCAGTTATCTGGGAGCCAATCTACACCGCTTCTA

AGTTCGCTGTTCAGGCTTTCGTTCACACCACCAGAAGACAGGTTTCTCAGCACGGTGTTAG

AGTTGGTGGTGTTTTGGGAGGTGGAGTTGTTAGGGGTTTGTTGGAGGAGTGGGGAAAGGAG

AAGATGGAGGAGGCTTTGGCTAACGGTTCTTTGATGCAGCCAATCGAGGTTGCTGAGTCT

GTTTTGTTCATGGTTACCAGATCTAAGAACGTTACCGTTAGAGACTTGGTTATCTTGCCAAA

CTCTGTTGACTTG

SEQ ID NO 9:
Amino acid sequence of D45S mutated ribitol dehydrogenase from E. coli
MNHSVPSMNTSLNGKVAAITGAASGIGLQCAKTLLEAGAKVVLISREGEKLQKIVVELGENAYL

QIDLFNGEQVDSMLARIVELAGGLDIFHANAGAYIGGPVAEGDPDIWDRVLNLNINAAFRCVRA

VLPHMIAQKSGDIIFTSSIAGVVPVIWEPIYTASKFAVQAFVHTTRRQVSQYGIRVGAVLPGPVVT

ALLDDWPKAKMDEALANGSLMQPIEVAESVLFMVTRSKNVTVRDLVILPNSVDL

SEQ ID NO 10:
Nucleotide sequence for encoding D45S mutated ribitol dehydrogenase
from E. coli
ATGAACCACTCTGTTCCATCTATGAACACCTCTTTGAACGGTAAGGTTGCTGCTATCACCG

GTGCTGCTTCTGGTATCGGTTTGCAGTGTGCTAAGACCTTGTTGGAGGCTGGTGCTAAGGT

TGTTTTGATGTGTAGAGAGGGTGAGAAGTTGGAGAAGATGGTTGTTGAGTTGGGTGAGAAG

GCTTACGCTTTGCAGATCGACTTGTTCAACGGTGAGCAGGTTGACTCTATGTTGGCTAGAA

TCGTTGAGTTGGCTGGTGGTTTGGACATCTTCCACGCTAACGCTGGTGCTTACATCGGTGG

TGGAGTTGGTGAGGGTGAGGGAGAGATGTGGGAGAGAGTTTTGAAGTTGAAGATGAAGGGT

GGTTTGAGATGTGTTAGAGGTGTTTTGGGAGAGATGATGGGTGAGAAGTGTGGTGAGATGA

TCTTCACCTCTTCTATCGCTGGTGTTGTTCCAGTTATCTGGGAGCCAATCTACACCGCTTCT

AAGTTCGCTGTTCAGGCTTTCGTTCACACCACCAGAAGACAGGTTTCTCAGTACGGTATCA

GAGTTGGTGUTGTTTTGCCAGGTCCAGTTGTTACCGCTTTGTTGGACGACTGGCCAAAGG

CTAAGATGGACGAGGCTTTGGCTAACGGTTCTTTGATGCAGCCAATCGAGGTTGCTGAGTC

TGTTTTGTTCATGGTTACCAGATCTAAGAACGTTACCGTTAGAGACTTGGTTATCTTGCCAA

ACTCTGTTGACTTG

SEQ ID NO 11:
Amino acid sequence of D38S mutated oxidoreductase from R. sphaeroides
MAELMQGKVAAITGAASGIGLECARTLVAEGATVVLISRAEDRLKALCAEIGPRALPLVVDLLDG

PQVSGMLPRILELAGSLDIFHANAGAYIGGQVAEGDPDAWDRMLNLNINAAFRSVHAVLPYMIE

RKSGDILFTSSVAGVVPVVWEPIYTASKFAVQAFVHSTRRQVAPHGVRVGAVLPGPVVTALLD

DWPKAKMEEALANGSLMQPKEVAEAVLFMLSRPKGVVIRDLVILPHSVDI

SEQ ID NO 12:
Nucleotide sequence encoding D38S mutated oxidoreductase
from R. sphaeroides
ATGGCTGAGTTGATGCAGGGTAAGGTTGCTGCTATCACCGGTGCTGCTTCTGGTATCGGTT

TGGAGTGTGCTAGAACCTTGGTTGCTGAGGGTGCTACCGTTGTTTTGATCTCTAGAGCTGA

GGACAGATTGAAGGCTTTGTGTGCTGAGATCGGTCCAAGAGCTTTGCCATTGGTTGTTGAC

TTGTTGGACGGTCCACAGGTTTCTGGTATGTTGCCAAGAATCTTGGAGTTGGCTGGTTCTT

TGGACATCTTCCACGCTAACGCTGGTGCTTACATCGGTGGTCAGGTTGCTGAGGGTGACC

CAGACGCTTGGGACAGAATGTTGAACTTGAACATCAACGCTGCTTTCAGATCTGTTCACGC

TGTTTTGCCATACATGATCGAGAGAAAGTCTGGTGACATCTTGTTCACCTCTTCTGTTGCTG

GTGTTGTTCCAGTTGTTTGGGAGCCAATCTACACCGCTTCTAAGTTCGCTGTTCAGGCTTT

CGTTCACTCTACCAGAAGACAGGTTGCTCCACACGGTGTTAGAGTTGGTGCTGTTTTGCCA

GGTCCAGTTGTTACCGCTTTGTTGGACGACTGGCCAAAGGCTAAGATGGAGGAGGCTTTG

GCTAACGGTTCTTTGATGCAGCCAAAGGAGGTTGCTGAGGCTGTTTTGTTCATGTTGTCTA

GACCAAAGGGTGTTGTTATCAGAGACTTGGTTATCTTGCCACACTCTGTTGACATC

SEQ ID NO 13:
EVPR13970 PCR oligonucleotide with an AscI restriction site (underlined)
CGGACCCTTATTAAACTAAAAGGCGCGCCAAA SEQ ID NO 14:
EVPR13974 PCR oligonucleotide for mutagenesis (lower case)
CTTCTCACCCTCTCTagaGATCAAAACAACCTT SEQ ID NO 15:
EVPR13973 PCR oligonucleotide for mutagenesis (lower case)
AAGGTTGTTTTGATCtctAGAGAGGGTGAGAAG SEQ ID NO 16:
EVPR13388 PCR oligonucleotide with a SphI restriction site (underlined)
TCATATCTTTCTAGATTCTCTTCGAGAGCATGC SEQ ID NO 17:
EVPR13976 PCR oligonucleotide for mutagenesis (lower case)
TCTGTCCTCAGCTCTagaGATCAAAACAACGGT SEQ ID NO 18:
EVPR13975 PCR oligonucleotide for mutagenesis (lower case)
ACCGTTGTTTTGATCtctAGAGCTGAGGACAGA SEQ ID NO 19:
EV5302 PCR oligonucleotide with a PstI restriction site (underlined)
AAAGGGCTGCAGGGATCCGTAGAAATCTTG SEQ ID NO 20:
EV5305 PCR oligonucleotide with a SalI restriction site (underlined)
AAAGGGGTCGACTTGCTCGTGGTCGGAAAT SEQ ID NO 21:
EV5304 PCR oligonucleotide with a NcoI restriction site (underlined)
AAAGGGCCATGGTTCTACTGTGCTAAGGCC SEQ ID NO 22:
EV5301 PCR oligonucleotide with a SpeI restriction site (underlined)
AAAGGGACTAGTAGAATGACACGGCCGACA

What is claimed is:

1. A host cell that is capable of producing D-ribulose, wherein the host cell comprises one or more heterologous nucleic acids encoding a polypeptide capable of converting D-ribulose to ribitol selected from:
   (a) a nucleic acid encoding a polypeptide capable of converting D-ribulose to ribitol comprising an amino acid sequence having at least 85% sequence identity to SEQ ID NO: 7, wherein said polypeptide has a serine and an arginine at the positions corresponding to positions 45 and 46 of the polypeptide of SEQ ID NO: 7, respectively;
   (b) a nucleic acid encoding a polypeptide capable of converting D-ribulose to ribitol comprising an amino acid sequence having at least 85% sequence identity to SEQ ID NO: 9, wherein said polypeptide has a serine and an arginine at the positions corresponding to positions 45 and 46 of the polypeptide of SEQ ID NO: 9, respectively; and
   (c) a nucleic acid encoding a polypeptide capable of converting D-ribulose to ribitol comprising an amino acid sequence having at least 85% sequence identity to SEQ ID NO: 11, wherein said polypeptide has a serine and an arginine at the positions corresponding to positions 38 and 39 of the polypeptide of SEQ ID NO: 11, respectively;
   wherein the host cell comprises an endogenous gene encoding a polypeptide that is capable of converting D-ribulose to D-arabitol, wherein said endogenous gene is inactivated through deletion of the gene, and wherein the host cell is a yeast cell.

2. The host cell of claim 1, wherein the host cell is capable of producing D-ribulose from D-glucose.

3. The host cell of claim 1, wherein the host cell comprises a heterologous nucleic acid encoding a polypeptide capable of converting D-ribulose to ribitol comprising an amino acid sequence having at least 95% sequence identity to SEQ ID NO: 7, and wherein said polypeptide has a serine and an arginine at the positions corresponding to positions 45 and 46 of the polypeptide of SEQ ID NO: 7, respectively.

4. The host cell of claim 1, wherein the host cell comprises a heterologous nucleic acid encoding a polypeptide capable of converting D-ribulose to ribitol comprising an amino acid sequence having at least 95% sequence identity to SEQ ID NO: 9, and wherein said polypeptide has a serine and an arginine at the positions corresponding to positions 45 and 46 of the polypeptide of SEQ ID NO: 9, respectively.

5. The host cell of claim 1, wherein the host cell comprises a heterologous nucleic acid encoding a polypeptide capable of converting D-ribulose to ribitol comprising an amino acid sequence having at least 95% sequence identity to SEQ ID NO: 11, and wherein said polypeptide has a serine and an arginine at the positions corresponding to positions 38 and 39 of the polypeptide of SEQ ID NO: 11, respectively.

6. The host cell of claim 1, wherein the yeast cell is *Pichia ohmeri*.

7. The host cell of claim 1, wherein the host cell comprises a heterologous nucleic acid encoding a polypeptide capable of converting D-ribulose to ribitol comprising SEQ ID NO 7.

8. The host cell of claim 1, wherein the host cell comprises a heterologous nucleic acid encoding a polypeptide capable of converting D-ribulose to ribitol comprising SEQ ID NO 9.

9. The host cell of claim 1, wherein the host cell comprises a heterologous nucleic acid encoding a polypeptide capable of converting D-ribulose to ribitol comprising SEQ ID NO 11.

10. The host cell of claim 1, wherein the host cell comprises more than one of the heterologous nucleic acids encoding a polypeptide capable of converting D-ribulose to ribitol.

11. The host cell of claim 10, wherein the host cell comprises (a) a heterologous nucleic acid encoding a polypeptide capable of converting D-ribulose to ribitol comprising an amino acid sequence having at least 85% sequence identity to SEQ ID NO:7, wherein said polypeptide has a serine and an arginine at the positions corresponding to positions 45 and 46 of the polypeptide of SEQ ID NO: 7, respectively, and (b) a heterologous nucleic acid encoding a polypeptide capable of converting D-ribulose to ribitol comprising an amino acid sequence having at least 85% sequence identity to SEQ ID NO: 9, wherein said polypeptide has a serine and an arginine at the positions corresponding to positions 45 and 46 of the polypeptide of SEQ ID NO: 9, respectively.

12. The host cell of claim 1, wherein the host cell comprises a heterologous nucleic acid encoding a polypeptide capable of converting D-ribulose to ribitol comprising an amino acid sequence having at least 85% sequence identity to SEQ ID NO: 7, and wherein said polypeptide has a serine and an arginine at the positions corresponding to positions 45 and 46 of the polypeptide of SEQ ID NO: 7, respectively.

13. The host cell of claim 1, wherein the host cell comprises a heterologous nucleic acid encoding a polypeptide capable of converting D-ribulose to ribitol comprising an amino acid sequence having at least 85% sequence identity to SEQ ID NO: 9, and wherein said polypeptide has a serine and an arginine at the positions corresponding to positions 45 and 46 of the polypeptide of SEQ ID NO: 9, respectively.

14. The host cell of claim 1, wherein the host cell comprises a heterologous nucleic acid encoding a polypeptide capable of converting D-ribulose to ribitol comprising an amino acid sequence having at least 85% sequence identity to SEQ ID NO: 11, and wherein said polypeptide has a serine and an arginine at the positions corresponding to positions 38 and 39 of the polypeptide of SEQ ID NO: 11, respectively.

15. A method for producing ribitol comprising culturing the host cell of claim 1 under cell culture conditions, wherein ribitol is produced by the host cell.

16. The method of claim 15, further comprising isolating the produced ribitol.

* * * * *

SEQUENCE LISTING

<160> NUMBER OF SEQ ID NOS: 22

<210> SEQ ID NO 1
<211> LENGTH: 249
<212> TYPE: PRT
<213> ORGANISM: E. aerogenes

<400> SEQUENCE: 1

Met Asn His Ser Val Ser Ser Met Asn Thr Ser Leu Ser Gly Lys Val
1               5                   10                  15

Ala Ala Val Thr Gly Ala Ala Ser Gly Ile Gly Leu Glu Cys Ala Lys
            20                  25                  30

Thr Leu Leu Gly Ala Gly Ala Lys Val Val Leu Ile Asp Arg Glu Gly
        35                  40                  45

Glu Lys Leu Asn Lys Ile Val Ala Glu Leu Gly Glu Asn Ala Phe Ala
    50                  55                  60

Leu Gln Val Asp Leu Met Gln Gly Glu Gln Val Asp Lys Ile Ile Asp
65                  70                  75                  80

Gly Ile Leu Gln Leu Ala Gly Arg Leu Asp Ile Phe His Ala Asn Ala
                85                  90                  95

Gly Ala Tyr Ile Gly Gly Pro Val Ala Glu Gly Asp Pro Asp Val Trp
            100                 105                 110

Asp Arg Val Leu His Leu Asn Thr Asn Ala Ala Phe Arg Cys Val Arg
        115                 120                 125

Ser Val Leu Pro His Met Ile Ala Gln Lys Ser Gly Asp Ile Ile Phe
130                 135                 140

Thr Ser Ser Ile Ala Gly Val Val Pro Val Ile Trp Glu Pro Ile Tyr
145                 150                 155                 160

Thr Ala Ser Lys Phe Ala Val Gln Ala Phe Val His Thr Thr Arg Arg
                165                 170                 175

Gln Val Ser Gln His Gly Val Arg Val Gly Ala Val Leu Pro Gly Pro
            180                 185                 190

Val Val Thr Ala Leu Leu Asp Asp Trp Pro Lys Glu Lys Met Glu Glu
        195                 200                 205

Ala Leu Ala Asn Gly Ser Leu Met Gln Pro Ile Glu Val Ala Glu Ser
    210                 215                 220

Val Leu Phe Met Val Thr Arg Ser Lys Asn Val Thr Val Arg Asp Leu
225                 230                 235                 240

Val Ile Leu Pro Asn Ser Val Asp Leu
                245

<210> SEQ ID NO 2
<211> LENGTH: 747
<212> TYPE: DNA
<213> ORGANISM: E. aerogenes

<400> SEQUENCE: 2
atgaaccact ctgtttcttc tatgaacacc tctttgtctg gtaaggttgc tgctgttacc    60
ggtgctgctt ctggtatcgg tttggagtgt gctaagacct tgttgggtgc tggtgctaag   120
gttgttttga tcgacagaga gggtgagaag ttgaacaaga tcgttgctga gttgggtgag   180
aacgctttcg ctttgcaggt tgacttgatg cagggtgagc aggttgacaa gatcatcgac   240
ggtatcttgc agttggctgg tagattggac atcttccacg ctaacgctgg tgcttacatc   300
ggtggtccag ttgctgaggg tgacccagac gtttgggaca gagttttgca cttgaacacc   360
aacgctgctt tcagatgtgt tagatctgtt ttgccacaca tgatcgctca gaagtctggt   420

```
gacatcatct tcacctcttc tatcgctggt gttgttccag ttatctggga gccaatctac    480
accgcttcta agttcgctgt tcaggctttc gttcacacca ccagaagaca ggtttctcag    540
cacggtgtta gagttggtgc tgttttgcca ggtccagttg ttaccgcttt gttggacgac    600
tggccaaagg agaagatgga ggaggctttg gctaacggtt ctttgatgca gccaatcgag    660
gttgctgagt ctgttttgtt catggttacc agatctaaga acgttaccgt tagagacttg    720
gttatcttgc caaactctgt tgacttg                                       747
```

<210> SEQ ID NO 3
<211> LENGTH: 249
<212> TYPE: PRT
<213> ORGANISM: E. coli

<400> SEQUENCE: 3

```
Met Asn His Ser Val Pro Ser Met Asn Thr Ser Leu Asn Gly Lys Val
1               5                   10                  15

Ala Ala Ile Thr Gly Ala Ala Ser Gly Ile Gly Leu Gln Cys Ala Lys
            20                  25                  30

Thr Leu Leu Glu Ala Gly Ala Lys Val Val Leu Ile Asp Arg Glu Gly
        35                  40                  45

Glu Lys Leu Gln Lys Ile Val Glu Leu Gly Glu Asn Ala Tyr Ala
    50                  55                  60

Leu Gln Ile Asp Leu Phe Asn Gly Glu Gln Val Asp Ser Met Leu Ala
65                  70                  75                  80

Arg Ile Val Glu Leu Ala Gly Gly Leu Asp Ile Phe His Ala Asn Ala
                85                  90                  95

Gly Ala Tyr Ile Gly Gly Pro Val Ala Glu Gly Asp Pro Asp Ile Trp
            100                 105                 110

Asp Arg Val Leu Asn Leu Asn Ile Asn Ala Ala Phe Arg Cys Val Arg
        115                 120                 125

Ala Val Leu Pro His Met Ile Ala Gln Lys Ser Gly Asp Ile Ile Phe
    130                 135                 140

Thr Ser Ser Ile Ala Gly Val Val Pro Val Ile Trp Glu Pro Ile Tyr
145                 150                 155                 160

Thr Ala Ser Lys Phe Ala Val Gln Ala Phe Val His Thr Thr Arg Arg
                165                 170                 175

Gln Val Ser Gln Tyr Gly Ile Arg Val Gly Ala Val Leu Pro Gly Pro
            180                 185                 190

Val Val Thr Ala Leu Leu Asp Asp Trp Pro Lys Ala Lys Met Asp Glu
        195                 200                 205

Ala Leu Ala Asn Gly Ser Leu Met Gln Pro Ile Glu Val Ala Glu Ser
    210                 215                 220

Val Leu Phe Met Val Thr Arg Ser Lys Asn Val Thr Val Arg Asp Leu
225                 230                 235                 240

Val Ile Leu Pro Asn Ser Val Asp Leu
                245
```

<210> SEQ ID NO 4
<211> LENGTH: 747
<212> TYPE: DNA
<213> ORGANISM: E. coli

<400> SEQUENCE: 4

```
atgaaccact ctgttccatc tatgaacacc tctttgaacg gtaaggttgc tgctatcacc    60
ggtgctgctt ctggtatcgg tttgcagtgt gctaagacct tgttggaggc tggtgctaag   120
gttgttttga tcgacagaga gggtgagaag ttgcagaaga tcgttgttga gttgggtgag   180
aacgcttacg ctttgcagat cgacttgttc aacggtgagc aggttgactc tatgttggct   240
agaatcgttg agtggctgg tggtttggac atcttccacg ctaacgctgg tgcttacatc    300
ggtggtccag ttgctgaggg tgacccagac atctgggaca gagttttgaa cttgaacatc   360
aacgctgctt tcagatgtgt tagagctgtt ttgccacaca tgatcgctca gaagtctggt   420
gacatcatct tcacctcttc tatcgctggt gttgttccag ttatctggga gccaatctac   480
accgcttcta gttcgctgt tcaggctttc gttcacacca ccagaagaca ggtttctcag   540
tacggtatca gagttggtgc tgttttgcca ggtccagttg ttaccgcttt gttggacgac   600
tggccaaagg ctaagatgga cgaggctttg gctaacggtt ctttgatgca gccaatcgag   660
gttgctgagt ctgttttgtt catggttacc agatctaaga acgttaccgt tagagacttg   720
gttatcttgc caaactctgt tgacttg                                        747
```

<210> SEQ ID NO 5
<211> LENGTH: 242
<212> TYPE: PRT
<213> ORGANISM: R. sphaeroides

<400> SEQUENCE: 5

```
Met Ala Glu Leu Met Gln Gly Lys Val Ala Ala Ile Thr Gly Ala Ala
1               5                   10                  15

Ser Gly Ile Gly Leu Glu Cys Ala Arg Thr Leu Val Ala Glu Gly Ala
            20                  25                  30

Thr Val Val Leu Ile Asp Arg Ala Glu Asp Arg Leu Lys Ala Leu Cys
        35                  40                  45

Ala Glu Ile Gly Pro Arg Ala Leu Pro Leu Val Val Asp Leu Leu Asp
    50                  55                  60

Gly Pro Gln Val Ser Gly Met Leu Pro Arg Ile Leu Glu Leu Ala Gly
65                  70                  75                  80

Ser Leu Asp Ile Phe His Ala Asn Ala Gly Ala Tyr Ile Gly Gly Gln
                85                  90                  95

Val Ala Glu Gly Asp Pro Asp Ala Trp Asp Arg Met Leu Asn Leu Asn
            100                 105                 110

Ile Asn Ala Ala Phe Arg Ser Val His Ala Val Leu Pro Tyr Met Ile
        115                 120                 125

Glu Arg Lys Ser Gly Asp Ile Leu Phe Thr Ser Ser Val Ala Gly Val
    130                 135                 140

Val Pro Val Val Trp Glu Pro Ile Tyr Thr Ala Ser Lys Phe Ala Val
145                 150                 155                 160

Gln Ala Phe Val His Ser Thr Arg Arg Gln Val Ala Pro His Gly Val
                165                 170                 175

Arg Val Gly Ala Val Leu Pro Gly Pro Val Val Thr Ala Leu Leu Asp
            180                 185                 190

Asp Trp Pro Lys Ala Lys Met Glu Glu Ala Leu Ala Asn Gly Ser Leu
        195                 200                 205

Met Gln Pro Lys Glu Val Ala Glu Ala Val Leu Phe Met Leu Ser Arg
    210                 215                 220
```

```
Pro Lys Gly Val Val Ile Arg Asp Leu Val Ile Leu Pro His Ser Val
225                 230                 235                 240

Asp Ile

<210> SEQ ID NO 6
<211> LENGTH: 726
<212> TYPE: DNA
<213> ORGANISM: R. sphaeroides

<400> SEQUENCE: 6
atggctgagt tgatgcaggg taaggttgct gctatcaccg gtgctgcttc tggtatcggt      60
ttggagtgtg ctagaacctt ggttgctgag ggtgctaccg ttgttttgat cgacagagct     120
gaggacagat tgaaggcttt gtgtgctgag atcggtccaa gagctttgcc attggttgtt     180
gacttgttgg acggtccaca ggtttctggt atgttgccaa gaatcttgga gttggctggt     240
tctttggaca tcttccacgc taacgctggt gcttacatcg tggtcaggt tgctgagggt      300 gacccagacg cttgggacag aatgttgaac ttgaacatca acgctgcttt cagatctgtt     360
cacgctgttt tgccatacat gatcgagaga agtctggtg acatcttgtt cacctcttct      420
gttgctggtg tgttccagt tgtttgggag ccaatctaca ccgcttctaa gttcgctgtt      480
caggctttcg ttcactctac cagaagacag gttgctccac acggtgttag agttggtgct     540
gttttgccag tccagttgt taccgctttg ttggacgact ggccaaaggc taagatggag     600
gaggctttgg ctaacggttc tttgatgcag ccaaaggagg ttgctgaggc tgttttgttc     660
atgttgtcta gaccaaaggg tgttgttatc agagacttgg ttatcttgcc acactctgtt     720
gacatc                                                                726

<210> SEQ ID NO 7
<211> LENGTH: 249
<212> TYPE: PRT
<213> ORGANISM: E. aerogenes

<400> SEQUENCE: 7

Met Asn His Ser Val Ser Ser Met Asn Thr Ser Leu Ser Gly Lys Val
1               5                   10                  15

Ala Ala Val Thr Gly Ala Ala Ser Gly Ile Gly Leu Glu Cys Ala Lys
                20                  25                  30

Thr Leu Leu Gly Ala Gly Ala Lys Val Val Leu Ile Ser Arg Glu Gly
        35                  40                  45

Glu Lys Leu Asn Lys Ile Val Ala Glu Leu Gly Glu Asn Ala Phe Ala
    50                  55                  60

Leu Gln Val Asp Leu Met Gln Gly Glu Gln Val Asp Lys Ile Ile Asp
65                  70                  75                  80

Gly Ile Leu Gln Leu Ala Gly Arg Leu Asp Ile Phe His Ala Asn Ala
                85                  90                  95

Gly Ala Tyr Ile Gly Gly Pro Val Ala Glu Gly Asp Pro Asp Val Trp
                100                 105                 110

Asp Arg Val Leu His Leu Asn Thr Asn Ala Ala Phe Arg Cys Val Arg
        115                 120                 125

Ser Val Leu Pro His Met Ile Ala Gln Lys Ser Gly Asp Ile Ile Phe
    130                 135                 140

Thr Ser Ser Ile Ala Gly Val Val Pro Val Ile Trp Glu Pro Ile Tyr
145                 150                 155                 160

Thr Ala Ser Lys Phe Ala Val Gln Ala Phe Val His Thr Thr Arg Arg
                165                 170                 175
```

Gln Val Ser Gln His Gly Val Arg Val Gly Ala Val Leu Pro Gly Pro
            180                 185                 190

Val Val Thr Ala Leu Leu Asp Asp Trp Pro Lys Glu Lys Met Glu Glu
195                 200                 205

Ala Leu Ala Asn Gly Ser Leu Met Gln Pro Ile Glu Val Ala Glu Ser
            210                 215                 220

Val Leu Phe Met Val Thr Arg Ser Lys Asn Val Thr Val Arg Asp Leu
225                 230                 235                 240

Val Ile Leu Pro Asn Ser Val Asp Leu
            245

<210> SEQ ID NO 8
<211> LENGTH: 747
<212> TYPE: DNA
<213> ORGANISM: E. aerogenes

<400> SEQUENCE: 8
atgaaccact ctgtttcttc tatgaacacc tctttgtctg gtaaggttgc tgctgttacc      60
ggtgctgctt ctggtatcgg tttggagtgt gctaagacct gttgggtgc tggtgctaag     120 gttgttttga tctctagaga gggtgagaag ttgaacaaga tcgttgctga gttgggtgag     180
aacgctttcg ctttgcaggt tgacttgatg cagggtgagc aggttgacaa gatcatcgac     240
ggtatcttgc agttggctgg tagattggac atcttccacg ctaacgctgg tgcttacatc     300
ggtggtccag ttgctgaggg tgacccagac gtttgggaca gagttttgca cttgaacacc     360
aacgctgctt tcagatgtgt tagatctgtt ttgccacaca tgatcgctca gaagtctggt     420
gacatcatct tcacctcttc tatcgctggt gttgttccag ttatctggga gccaatctac     480
accgcttcta gttcgctgt tcaggctttc gttcacacca ccagaagaca ggtttctcag     540
cacggtgtta gagttggtgc tgttttgcca ggtccagttg ttaccgcttt gttggacgac     600
tggccaaagg agaagatgga ggaggctttg gctaacggtt ctttgatgca gccaatcgag     660
gttgctgagt ctgttttgtt catggttacc agatctaaga acgttaccgt tagagacttg     720
gttatcttgc caaactctgt tgacttg                                        747

<210> SEQ ID NO 9
<211> LENGTH: 249
<212> TYPE: PRT
<213> ORGANISM: E. coli

<400> SEQUENCE: 9

Met Asn His Ser Val Pro Ser Met Asn Thr Ser Leu Asn Gly Lys Val
1               5                   10                  15

Ala Ala Ile Thr Gly Ala Ala Ser Gly Ile Gly Leu Gln Cys Ala Lys
            20                  25                  30

Thr Leu Leu Glu Ala Gly Ala Lys Val Val Leu Ile Ser Arg Glu Gly
        35                  40                  45

Glu Lys Leu Gln Lys Ile Val Glu Leu Gly Glu Asn Ala Tyr Ala
    50                  55                  60

Leu Gln Ile Asp Leu Phe Asn Gly Glu Gln Val Asp Ser Met Leu Ala
65                  70                  75                  80

Arg Ile Val Glu Leu Ala Gly Gly Leu Asp Ile Phe His Ala Asn Ala
                85                  90                  95

Gly Ala Tyr Ile Gly Gly Pro Val Ala Glu Gly Asp Pro Asp Ile Trp
            100                 105                 110

Asp Arg Val Leu Asn Leu Asn Ile Asn Ala Ala Phe Arg Cys Val Arg
            115                 120                 125

Ala Val Leu Pro His Met Ile Ala Gln Lys Ser Gly Asp Ile Ile Phe
        130                 135                 140

Thr Ser Ser Ile Ala Gly Val Val Pro Val Ile Trp Glu Pro Ile Tyr
145                 150                 155                 160

Thr Ala Ser Lys Phe Ala Val Gln Ala Phe Val His Thr Thr Arg Arg
                165                 170                 175

Gln Val Ser Gln Tyr Gly Ile Arg Val Gly Ala Val Leu Pro Gly Pro
            180                 185                 190

Val Val Thr Ala Leu Leu Asp Asp Trp Pro Lys Ala Lys Met Asp Glu
        195                 200                 205

Ala Leu Ala Asn Gly Ser Leu Met Gln Pro Ile Glu Val Ala Glu Ser
    210                 215                 220

Val Leu Phe Met Val Thr Arg Ser Lys Asn Val Thr Val Arg Asp Leu
225                 230                 235                 240

Val Ile Leu Pro Asn Ser Val Asp Leu
                245

<210> SEQ ID NO 10
<211> LENGTH: 747
<212> TYPE: DNA
<213> ORGANISM: E. coli

<400> SEQUENCE: 10
atgaaccact ctgttccatc tatgaacacc tctttgaacg gtaaggttgc tgctatcacc      60
ggtgctgctt ctggtatcgg tttgcagtgt gctaagacct tgttggaggc tggtgctaag     120
gttgttttga tctctagaga gggtgagaag ttgcagaaga tcgttgttga gttgggtgag     180
aacgcttacg ctttgcagat cgacttgttc aacggtgagc aggttgactc tatgttggct     240
agaatcgttg agttggctgg tggtttggac atcttccacg ctaacgctgg tgcttacatc     300
ggtggtccag ttgctgaggg tgacccagac atctgggaca gagttttgaa cttgaacatc     360
aacgctgctt tcagatgtgt tagagctgtt ttgccacaca tgatcgctca gaagtctggt     420
gacatcatct tcacctcttc tatcgctggt gttgttccag ttatctggga gccaatctac     480
accgcttcta agttcgctgt tcaggctttc gttcacacca ccagaagaca ggtttctcag     540
tacggtatca gagttggtgc tgttttgcca ggtccagttg ttaccgcttt gttggacgac     600
tggccaaagg ctaagatgga cgaggctttg gctaacggtt ctttgatgca gccaatcgag     660
gttgctgagt ctgttttgtt catggttacc agatctaaga acgttaccgt tagagacttg     720
gttatcttgc caaactctgt tgacttg                                         747

<210> SEQ ID NO 11
<211> LENGTH: 242
<212> TYPE: PRT
<213> ORGANISM: R. sphaeroides

<400> SEQUENCE: 11

Met Ala Glu Leu Met Gln Gly Lys Val Ala Ala Ile Thr Gly Ala Ala
1               5                   10                  15

Ser Gly Ile Gly Leu Glu Cys Ala Arg Thr Leu Val Ala Glu Gly Ala
            20                  25                  30

Thr Val Val Leu Ile Ser Arg Ala Glu Asp Arg Leu Lys Ala Leu Cys
        35                  40                  45

```
Ala Glu Ile Gly Pro Arg Ala Leu Pro Leu Val Val Asp Leu Leu Asp
         50                  55                  60

Gly Pro Gln Val Ser Gly Met Leu Pro Arg Ile Leu Glu Leu Ala Gly
 65                  70                  75                  80

Ser Leu Asp Ile Phe His Ala Asn Ala Gly Ala Tyr Ile Gly Gly Gln
                 85                  90                  95

Val Ala Glu Gly Asp Pro Asp Ala Trp Asp Arg Met Leu Asn Leu Asn
            100                 105                 110

Ile Asn Ala Ala Phe Arg Ser Val His Ala Val Leu Pro Tyr Met Ile
            115                 120                 125

Glu Arg Lys Ser Gly Asp Ile Leu Phe Thr Ser Val Ala Gly Val
130                 135                 140

Val Pro Val Val Trp Glu Pro Ile Tyr Thr Ala Ser Lys Phe Ala Val
145                 150                 155                 160

Gln Ala Phe Val His Ser Thr Arg Arg Gln Val Ala Pro His Gly Val
                165                 170                 175

Arg Val Gly Ala Val Leu Pro Gly Pro Val Val Thr Ala Leu Leu Asp
                180                 185                 190

Asp Trp Pro Lys Ala Lys Met Glu Glu Ala Leu Ala Asn Gly Ser Leu
            195                 200                 205

Met Gln Pro Lys Glu Val Ala Glu Ala Val Leu Phe Met Leu Ser Arg
210                 215                 220

Pro Lys Gly Val Val Ile Arg Asp Leu Val Ile Leu Pro His Ser Val
225                 230                 235                 240

Asp Ile
```

<210> SEQ ID NO 12
<211> LENGTH: 726
<212> TYPE: DNA
<213> ORGANISM: R. sphaeroides

<400> SEQUENCE: 12

```
atggctgagt tgatgcaggg taaggttgct gctatcaccg gtgctgcttc tggtatcggt      60
ttggagtgtg ctagaacctt ggttgctgag ggtgctaccg ttgttttgat ctctagagct     120
gaggacagat tgaaggcttt tgtgtgctga gatcggtcca agagctttgc cattggttgtt    180
gacttgttgg acggtccaca ggtttctggt atgttgccaa gaatcttgga gttggctggt     240
tctttggaca tcttccacgc taacgctggt gcttacatcg gtggtcaggt tgctgagggt     300
gacccagacg cttgggacag aatgttgaac ttgaacatca acgctgcttt cagatctgtt     360
cacgctgttt tgccatacat gatcgagaga aagtctggtg acatcttgtt cacctcttct     420
gttgctggtg ttgttccagt tgtttgggag ccaatctaca ccgcttctaa gttcgctgtt     480
caggctttcg ttcactctac cagaagacag gttgctccac acggtgttag agttggtgct     540
gttttgccag tccagttgtt taccgctttg ttggacgact ggccaaaggc taagatggag     600
gaggctttgg ctaacggttc tttgatgcag ccaaaggagg ttgctgaggc tgttttgttc     660
atgttgtcta gaccaaaggg tgttgttatc agagacttgg ttatcttgcc acactctgtt     720
gacatc                                                                726
```

<210> SEQ ID NO 13
<211> LENGTH: 32
<212> TYPE: DNA
<213> ORGANISM: Artificial sequence
<220> FEATURE:

<223> OTHER INFORMATION: Oligo

<400> SEQUENCE: 13 cggacccctta ttaaactaaa aggcgcgcca aa                              32

<210> SEQ ID NO 14
<211> LENGTH: 33
<212> TYPE: DNA
<213> ORGANISM: Artificial sequence
<220> FEATURE:
<223> OTHER INFORMATION: Oligo

<400> SEQUENCE: 14
cttctcaccc tctctagaga tcaaaacaac ctt                              33

<210> SEQ ID NO 15
<211> LENGTH: 33
<212> TYPE: DNA
<213> ORGANISM: Artificial sequence
<220> FEATURE:
<223> OTHER INFORMATION: Oligo

<400> SEQUENCE: 15
aaggttgttt tgatctctag agagggtgag aag                              33

<210> SEQ ID NO 16
<211> LENGTH: 33
<212> TYPE: DNA
<213> ORGANISM: Artificial sequence
<220> FEATURE:
<223> OTHER INFORMATION: Oligo

<400> SEQUENCE: 16
tcatatcttt ctagattctc ttcgagagca tgc                              33

<210> SEQ ID NO 17
<211> LENGTH: 33
<212> TYPE: DNA
<213> ORGANISM: Artificial sequence
<220> FEATURE:
<223> OTHER INFORMATION: Oligo

<400> SEQUENCE: 17
tctgtcctca gctctagaga tcaaaacaac ggt                              33

<210> SEQ ID NO 18
<211> LENGTH: 33
<212> TYPE: DNA
<213> ORGANISM: Artificial sequence
<220> FEATURE:
<223> OTHER INFORMATION: Oligo

<400> SEQUENCE: 18
accgttgttt tgatctctag agctgaggac aga                              33

<210> SEQ ID NO 19
<211> LENGTH: 30
<212> TYPE: DNA
<213> ORGANISM: Artificial sequence
<220> FEATURE:
<223> OTHER INFORMATION: Oligo

<400> SEQUENCE: 19
aaagggctgc agggatccgt agaaatcttg                                  30

```
<210> SEQ ID NO 20
<211> LENGTH: 30
<212> TYPE: DNA
<213> ORGANISM: Artificial sequence
<220> FEATURE:
<223> OTHER INFORMATION: Oligo

<400> SEQUENCE: 20 aaagggtcg acttgctcgt ggtcggaaat                                            30

<210> SEQ ID NO 21
<211> LENGTH: 30
<212> TYPE: DNA
<213> ORGANISM: Artificial sequence
<220> FEATURE:
<223> OTHER INFORMATION: Oligo

<400> SEQUENCE: 21
aaagggccat ggttctactg tgctaaggcc                                           30

<210> SEQ ID NO 22
<211> LENGTH: 30
<212> TYPE: DNA
<213> ORGANISM: Artificial sequence
<220> FEATURE:
<223> OTHER INFORMATION: Oligo

<400> SEQUENCE: 22
aaagggacta gtagaatgac acggccgaca                                           30
```